United States Patent [19]
Fischer et al.

[11] 3,918,356
[45] Nov. 11, 1975

[54] APPARATUS FOR THE PRODUCTION OF CHEESE

[75] Inventors: Wilhelm Fischer, Durach; Friedrich Kraush, Durach-Heberlings; Walter Riesner, Durach; Hubert Sonnenmoser, Kempten, all of Germany

[73] Assignee: Lever Brothers Company, New York, N.Y.

[22] Filed: Mar. 19, 1973

[21] Appl. No.: 342,589

[52] U.S. Cl. .................................. 99/452; 426/36
[51] Int. Cl.² ................... A01J 25/16; A23C 19/02
[58] Field of Search ........ 99/452, 466, 456; 426/36, 426/34, 38

[56] References Cited
UNITED STATES PATENTS

| | | | |
|---|---|---|---|
| 1,086,814 | 2/1914 | Gardiner, Jr. .......................... | 452/X |
| 2,657,993 | 11/1953 | Arkin .................................. | 99/452 X |
| 2,907,109 | 10/1959 | Palmer ................................ | 99/452 X |
| 2,917,827 | 12/1959 | Lankford ............................. | 99/452 |
| 3,735,490 | 5/1973 | Thomson ............................. | 99/452 |
| 3,780,199 | 12/1973 | Carswell ............................. | 99/452 X |

FOREIGN PATENTS OR APPLICATIONS 1,169,718    5/1964    Germany

*Primary Examiner*—Billy S. Taylor
*Attorney, Agent, or Firm*—Kenneth F. Dusyn; James J. Farrell; Arnold Grant

[57] ABSTRACT

A device for producing soft cheese and similar milk based products comprises a series of linked vats on a circular trackway. A continuous, smooth movement is achieved for coagulation of milk into curd. This results in formation of consistent, good quality cheese in a mechanised manner.

6 Claims, 4 Drawing Figures

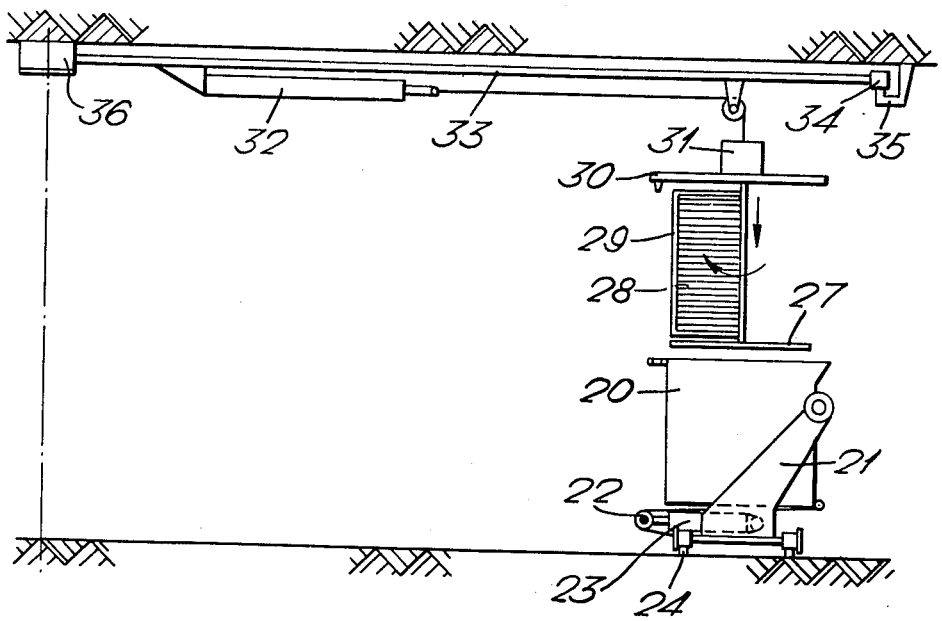
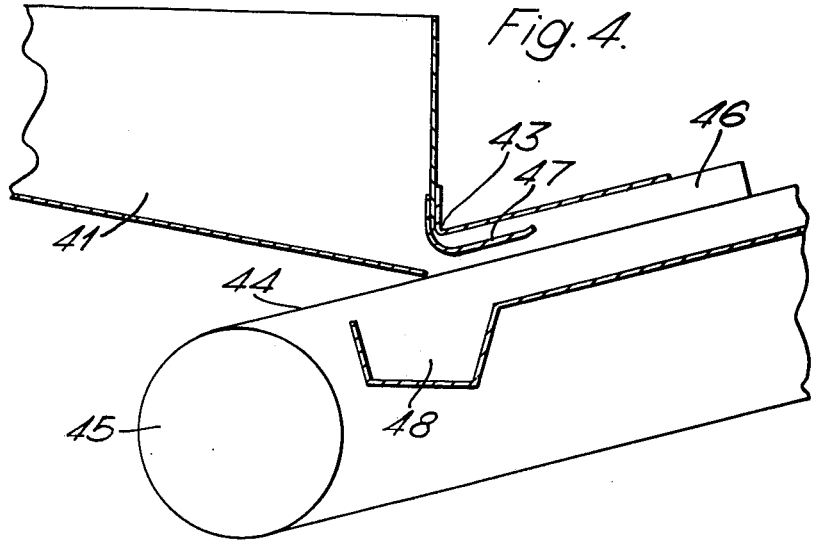

APPARATUS FOR THE PRODUCTION OF CHEESE

The invention relates to a device for the production of milk based products such as cheese, and particularly soft cheeses of the camembert and brie type.

Cheese may be manufactured by coagulating milk, and necessary additives such as rennet and lactic acid, to form curds and whey. The curd is then separated out from the whey, may be fed into moulds, and allowed to stand for a period to enable the curd in the moulds to further solidify for a period of up to 24 hours, and the so formed products are then matured in the case of soft cheeses such as camembert or brie for some weeks, and hard cheeses for considerably longer periods, subdivided if necessary and packed for sale.

A critical feature of such a cheese making process, is the coagulation of the milk to form curd. In the production of soft cheese a light and porous curd is of paramount importance for the quality of the final product. In order to obtain such light and porous curd it is desirable that operation should be consistent and that the coagulating liquid milk mass should be subjected to the minimum of shocks during coagulation.

Previously this coagulation has been performed in a semi-manual way since attempts at mechanical automatic operation have not led to a curd of the quality obtained manually and therefore not to a consistent or suitable end product.

The present invention is concerned with providing a mechanical device for this purpose which produces a curd which in many cases is of a lightness and porosity which is at least equal to that of the best heretofore manually obtained ones and even surpasses the quality of many manually and semi-manually produced curds.

Accordingly the invention provides a device for coagulating liquid milk products in the production of milk based products, such as, cheese comprising a circular trackway, a plurality of linked vats mounted for movement round said trackway, and driving means which is arranged to drive the linked vats slowly, at constant velocity smoothly and sequentially past a filling station, a cutting station and an emptying station, the said stations being located sequentially round said trackway, the filling station having means for addition of the liquid milk porduct to each vat as it comes to the filling station, the cutting station having a cutter device which is movable with and insertable into each vat in turn for cutting curd as it coagulates in the vat, and the emptying station having means for emptying whey and the coagulated curd from each vat as it comes to the emptying station.

The important feature of this invention is that in use the vats move with a constant velocity around the circular smooth trackway. Thus the coagulating milk product is subject to the minimum of accelerating or jarring forces which might otherwise upset the coagulation process. Moreover, the coagulating milk product in each vat is subjected to basically the same treatment and the end product therefore has a consistent quality.

To achieve the smooth movement, it is desirable that the vats should be linked together and move as one unit with a high moment of inertia around the circular trackway at constant velocity. It is important for this that the trackway should be circular since this enables the vats to progress continuously without any changes in centrifugal forces or accelerations while they progress on a closed loop circuit.

In a preferred form the trackway is in the form of smooth surfaced rails, and the device comprises a plurality of wheel frames, each wheel frame running via wheels on said rails, being rigidly connected to the next successive wheel-frame, and carrying a vat by means of a pivotal connection which enables the vat to tip relative to the wheelframe for emptying at said discharge station.

In a practical embodiment, 16 vats were so arranged on a circular trackway of approximately 12 metres diameter and each vat had a capacity of about 1,000 litres of liquid. The system was driven by a hydraulic motor at a constant velocity which enabled each vat to do a complete circuit in about 1 hour. The rails were ground and polished very flat and other equipment in use was so smooth that in operation while the vats were in motion it was found possible to balance a coin on edge on the moving equipment and this coin remained perfectly steady; this test graphically illustrating how smooth the system could be in practice Using a 60 minute circuit time, it was found convenient to cut the coagulating cheese mass at the cutting station after about 25 minutes. Cutting a coagulating cheese mass is in itself a known process.

An optional feature is a stirring device which is movable with and insertable into each of the vats in turn and mounted at a stirring station located between the cutting station and the emptying station. In practice stirring is found necessary occasionally at certain times of the year and with certain types of milk. Use of the stirrer depends on experience of the operator.

At the emptying station it was found convenient to arrange a discharge chute which was located to receive curds and whey from at least two vats as they sequentially moved and tilted for emptying. An advantage of the overlapping emptying of successive vats was that varying concentrations of curd at the top and bottom of a particular vat were compensated for by mixture from a following vat. At this stage it was found convenient to take the whey out with the curd, rather than withdrawing it previously, since the whey helped wash the curd out of the vats and along the discharge chute.

Preferably a stirring device is arranged at the end of the discharge chute to further mix the curds and whey.

A filter belt conveyor can conveniently be arranged to filter out whey and transport curd from the discharge chute to a moulding station. A large proportion of the whey may be drained out while being transported on the filter belt conveyor. Conveniently means is provided for sub-dividing the partially drained curd into separate streams parallel to its movement along the filter belt conveyor. Such subdividing means may be a plurality of parallel guide plates or rotating discs. With such an arrangement and with the particular process and filtering conditions, the curd deposited in moulds may have a dry matter content higher than that of manually produced curds, e.g. about 20%, so that is solidification in the moulds can be finished in considerably shorter time but still slow enough to ensure the desired porosity and lightness.

In particular, the cheese mass only needs to reside in the cheese moulds for between 6 and 10 hours, to achieve sufficient drainage of the surplus whey whereas in previous hand processes the cheese mass had to stay in moulds for between 18 and 24 hours. The cheese mass is subsequently processed, for example salting in the case of camembert preparation, in the conventional way.

An embodiment of the device according to the invention is described with the aid of the attached drawings.

FIG. 3 shows the cutting station.

FIG. 4 shows the dispensing of the cheese mass at the start of the filter belt.

Figure 1:
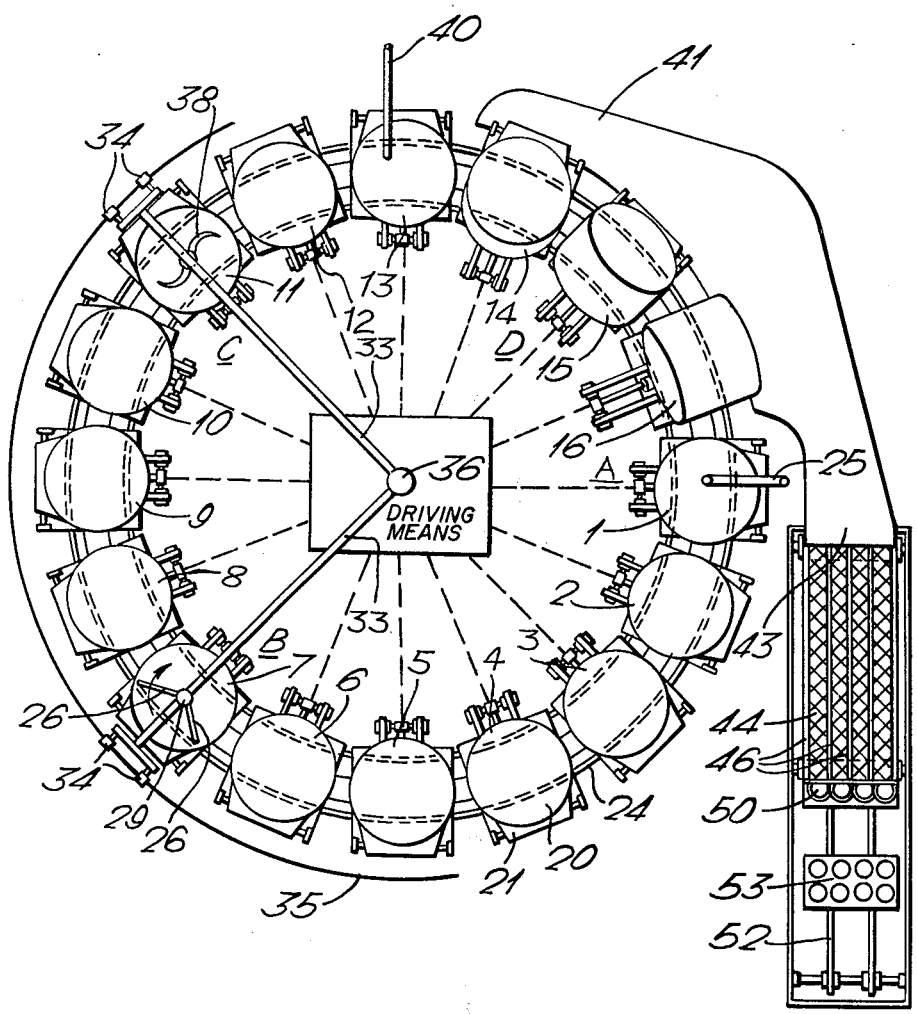
FIG. 1 shows a plan view of the entire plant.
Figure 2:
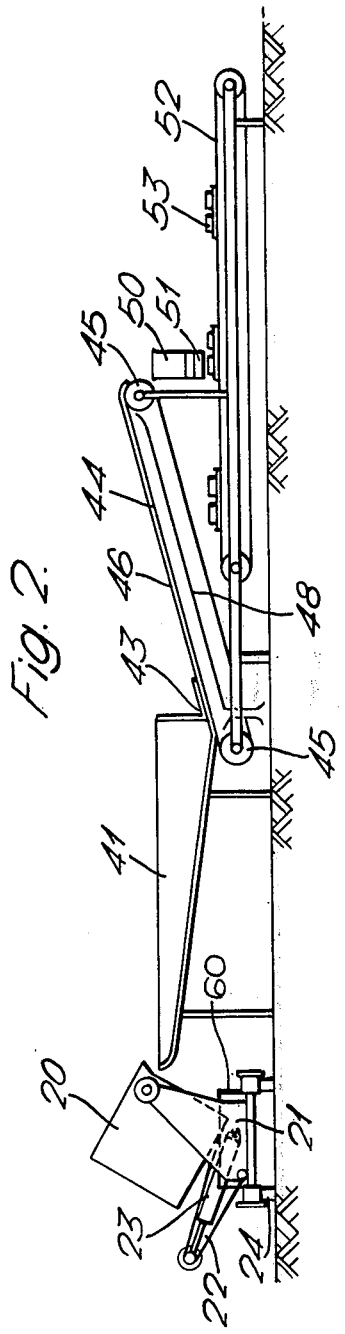
FIG. 2 shows a lateral elevation of the discharge station with the filter belt and the apportioning device.

The device consists of 16 vats 20 which are mounted on a circular trackway, and in the course of their continuous rotation lasting about an hour, they each pass through the positions labelled with the numbers 1 to 16 in FIG. 1. Located round the track are the filling station A, the cutting station B, if required a stirring station C, and a discharge station D. If necessary an additional station for washing the tanks 20 can be installed between the discharge station D and the filling station A. A washing station is, however, not necessary if as in the invention the milk or cheese mass does not remain in the tanks for longer than about 60 minutes and the tanks are filled again immediately after the discharge process.

The vats 20 are upright cylinders with a preferred capacity of 1000 litres. They are each mounted on a wheel frame 21 by a pivotal connection controlled by a tipping device 22 preferably in the form of a hydraulic or pneumatic cylinder 23. All the wheel frames 21 are rigidly linked together and run on rails 24. These rails are ground and polished to a high degree of smoothness. The vats 20 contain no fittings whatsoever and can therefore be completely emptied by tipping. The power unit for the wheel frames 21 is not illustrated and can take any appropriate form. Thus for example a preferably continuously adjustable driving motor can be set up at the centre of the circular track to propel the vats 20 continuously by means of spokes which make contact with the wheel frames 21. The ability to adjust the speed of rotation is regarded as useful so that the processing time in the tanks can be altered should this ever become necessary as a result e.g. of seasonal fluctuations in the quality of the milk or similar factors. Such adjustment would not normally take place during use, and normally the vats would be continuously moving, in use, at constant speed.

At the filling station A, the milk flows from a feed pipe 25 into the vat 20 shown in position 1. Rennet and lactic acid bacteria can be added simultaneously. As a result of the constant movement of the vat 20 during filling, adequate mixing ensues without the milk being excessively agitated. The feed pipe 25 can be lowered into the vat and gradually pulled out again as the level of liquid in the vat rises. Cutting takes place at station B (see FIG. 3) when the vat is substantially in position 7 after revolving for about 25 minutes. The cutting device 26 is appropriately composed of a circular base cutting frame 27 and a vertical cutting frame 28 which is turned through 180° while the cheese mass is held in position by a vertical retaining plate 29. The cutting device is suspended from the ceiling of the working area and after it has been lowered into a vat 20 it can move round with the vat during the cutting process. During this time it rests on the upper edge of the vat by means of a centring ring 30. The rotary motion of the cutting frame 28, and if necessary, a 90° rotation of the base cutting frame 27 before withdrawal, can be carried out by means of a suitable power unit, e.g. a hydraulic stepping mechanism. The cutting device can be lowered and raised by means of a hoisting mechanism 32. This is preferably located on a supporting arm 33 which can be turned about a bearing 36 on the ceiling of the room and is supported by rollers 34 on a rail 35. A stirrer 38 can be set up at station C if it proves advantageous to agitate the curd. The stirrer can also be lowered into the vat, and is mounted on a supporting arm 33 such as that described previously for the cutting device so as to be movable with movement of the vat.

The whey accumulating above the curd may be removed from the vats 20 before the curd is poured out at staton D. This can be done by means of an overhead suction pipe dipping into the whey. Alternatively, or additionally, the whey at the top of the vat can be decanted into a whey sieve located in the discharge chute 41 when the vat 20 reaches position 14 and starts to discharge its contents to the channel 41. In practice however it has been found preferable to leave the whey in with the curd, until the whole mass is removed from the vats at discharge station D through the operation of tipping means 60.

At the discharge station D the discharge chute 41 extends substantially over the vat positions 14 to 16 as illustrated. It is suitably arranged outside the path of the vats 20. The tipping motions of the vats are controlled in such a manner that the stream of cheese curd flowing to the lower end of the discharge chute 41 is as uniform as possible.

At the lower end of the chute 41 rotary paddle mixers (not shown) are preferably provided, and these further mix the curds and whey issuing from the vats. The curd then comes via a preferably slot-shaped dispensing device 43 on to a relatively short filter belt conveyor 44 and thence into mould tubes 50 at the lower end of which there is an apportioning device 51 which deposits individual portions in groups of moulds 53 on a stepwise advanced conveyor 52. Here also the curd is treated with particular care.

Vertical dividing strips 46 sub-divide the curd delivered to the filter belt conveyor 44 into separate streams the width of which is substantially the same as the diameter of the mould pipes 50. In an alternative form the dividing strips 46 are replaced by rotary discs performing the same function as strips 46 and located above the discharge end of the filter belt conveyor. The thickness of the mass of curd delivered can be adjusted by means of a vertically movable dispensing plate 47. In a preferred embodiment the dispensing plates 47 are tongue-shaped and lie essentially parallel to the filter belt conveyor 44. By this means the curd particles are deposited on the belt undamaged. The filter belt conveyor runs over guide rollers 45. Underneath it there is a whey collection trough 48.

In practice, in the device described 16 vats of 1000 litre capacity were continuously passed round a trackway of 12 metres diameter in 1 hour, and rows of moulds 51 were portioned every 3 seconds. The average age, and hence consistency and quality, of these rows was virtually the same, due to the overlapping of the tilting vats, mixing at the end of the chute 41, and the sub-division into separate streams emerging the conveyor 44, so that the tubes 50 were filled equally. Thus the curd formation and subsequent portions was virtually consistent throughout.

The preparation of curd, according to the invention, in large constantly moving vats and then in other equipment for the protective transport of the curd to the apportioning device results in high quality camembert or brie cheese in a processing time which is substantially shorter than the manual scooping process. As well as saving manpower the plant according to the invention can be fully automated. In addition to the filling, discharging and apportioning processes it is also possible for the curd cutting process to be actuated at a precise stage in the coagulation process. By this means it is possible to avoid human errors which can occasionally arise when individual processing stages are carried out for different times so that over a lengthy period it is possible to manufacture products having the same quality and, e.g. the same weight.

What is claimed is:

1. An apparatus for coagulating liquid milk products for the production of soft cheese comprising:
   a. a circular trackway having smooth surfaced rails;
   b. a plurality of wheel frames positioned on wheels that overlie and travel on said circular trackway, said wheel frames being rigidly linked to each other;
   c. a corresponding number of vats that are pivotally mounted to said wheel frames and a tipping means intermediate said wheel frames and said vats to allow each vat to be independently tipped relative to the respective wheel frame;
   d. a filling station comprising overhead means relative to said vats for the addition of liquid milk product and coagulating agents to said vats;
   e. a cutting station comprising overhead cutting means relative to said vats that is moveable and insertable into each vat for cutting curd as it coagulates;
   f. a discharge station comprising a discharge chute positioned circumfirentially about said circular trackway for receiving the whey and coagulated curd formed from at least two adjacent vats, said chute extending in a downwardly direction from an upper end where the whey and curd are received from said vats, to a lower end to which the whey and curd is transported; and
   g. a drive means for sequentially displacing said wheel frames over said circular trackway in predetermined spaced time relationship at constant velocity from said filling station to said cutting station to said discharge station.

2. The apparatus defined in claim 1 additionally comprising a stirring station positioned intermediate said cutting station and said discharge station, said stirring station comprising overhead stirring means relative to said vats that is movable with and insertable into each vat for agitating the curd that is formed.

3. The apparatus defined in claim 1 additionally comprising an endless filter belt conveyor for transporting curd to a molding apparatus and positioned in a manner to receive the whey and curd discharged from said discharge chute, said conveyor comprising an endless flexible porous belt and an underlying through for filtering and collecting the whey, respectively.

4. The apparatus defined in claim 3 additionally comprising stirring means positioned at the lower end of said discharge chute for mixing the whey and curd discharged from said vats.

5. The apparatus defined in claim 3 additionally comprising means for regulating the thickness and width of the curd preliminary to its introduction into a molding apparatus.

6. The apparatus defined in claim 5 wherein said thickness regulating means comprises a vertically displaceable dispensing plate overlying the lower end of said discharge chute and operatively affixed thereto to form a predetermined vertical opening for the passage of said whey and curd onto said filter belt conveyor, and said width regulating means comprising a plurality of dividing strips extending over the length of and in the same direction as said filter belt conveyor, said strips being spaced apart at a predetermined distance corresponding to the desired width of curd for its entry into the molding apparatus.

* * * * *